United States Patent
Li et al.

(10) Patent No.: US 6,633,701 B2
(45) Date of Patent: Oct. 14, 2003

(54) METHOD OF MANUFACTURING A CORE COLLIMATING ASSEMBLY FOR DWDM DEVICES

(75) Inventors: David Ya Li, Sunnyvale, CA (US); Lawrence Zhang, Fremont, CA (US); Xiaoxing Zhang, Milpitas, CA (US)

(73) Assignee: Foxconn Optical Technology, Inc., Grorge Town (KY)

( * ) Notice: Subject to any disclaimer, the term of this patent is extended or adjusted under 35 U.S.C. 154(b) by 228 days.

(21) Appl. No.: 09/764,650

(22) Filed: Jan. 16, 2001

(65) Prior Publication Data

US 2002/0094162 A1 Jul. 18, 2002

(51) Int. Cl.[7] .................................................. G02B 6/32
(52) U.S. Cl. .......................................... 385/34; 385/24
(58) Field of Search ............................... 385/24, 31, 33, 385/34, 80

(56) References Cited

U.S. PATENT DOCUMENTS

| | | | |
|---|---|---|---|
| 6,198,858 B1 * | 3/2001 | Pan et al. | 385/24 |
| 6,246,813 B1 * | 6/2001 | Zheng | 385/34 |
| 6,282,339 B1 * | 8/2001 | Zheng | 385/34 |
| 2002/0074086 A1 * | 6/2002 | Nakamura et al. | 156/329 |

* cited by examiner

Primary Examiner—Hemang Sanghavi
Assistant Examiner—Omar Rojas
(74) Attorney, Agent, or Firm—Wei Te Chung

(57) ABSTRACT

A method of manufacturing a collimating assembly includes the following steps: preparing a GRIN lens subassembly; preparing a dual-fiber (DF) pigtail subassembly; fitting the GRIN lens subassembly and the DF pigtail subassembly together; applying epoxy onto a junction zone between the GRIN lens subassembly and the DF pigtail subassembly; and baking the junction zone for curing the epoxy thereof until the epoxy spreading uniformly over the junction zone due to the so-called capillarity phenomenon.

12 Claims, 5 Drawing Sheets

METHOD OF MANUFACTURING A CORE COLLIMATING ASSEMBLY FOR DWDM DEVICES

BACKGROUND OF THE INVENTION

The present invention relates to a method of manufacturing a core collimating assembly for applications in DWDM devices.

Dense-Wavelength-Division-Multiplexing (DWDM) systems take advantage of advanced optical technology (e.g., tunable lasers, narrow-band (NB) optical filter, etc.) to generate many wavelength in the range around 1550 nm, which has gained itself the mainstream trend of the optical telecommunication industry nowadays and in the future. Many crucial optical components applied in DWDM systems, such as OADM, multiplexing/demultiplexing modules, optical switches, couplers, optical transceivers, etc., require collimated light beams. Therefore, collimating assemblies thus attain important and wide applications in manufactures of these optical components.

Collimating assemblies may generally be divided into three types as discussed in the following contents.

The first type is Prism type which purely employs a prism or an array of prisms to transfer dispersive light beams into collimated parallel light beams. A related example may be referred to U.S. Pat. No. 4,350,410.

The second type is Lens type which may use spherical lenses, planoconvex lenses, biconvex lenses, single aspherical surface lenses or Gradient Index (GRIN) Lens to achieve the same function as discussed above. Details related please refer to U.S. Pat. Nos. 4,575,194; 4,758,071 and 5446,815.

The third is a combination of the first and second types, which combines both prisms and lenses to form a collimating assembly for gaining collimated parallel light beams. Closely related inventions have been disclosed in U.S. Pat. Nos. 4,609,258 and 5,321,717.

However, in addition to traditional prisms or lenses, filters are also applied to fabricate collimating assemblies, esp. when the corresponding collimating assemblies are provided for thin film filter based DWDM devices. Such collimating assemblies may be acted as 3 or more ports device core. A core collimating assembly for 3-port DWDM devices is the key part for thin film filter based DWDM devices and usually comprises a dual fiber (DF) collimator and a narrow band (NB) filter.

Referring to FIGS. 8 and 9, one embodiment of an improved method of fabricating a lens-type collimating assembly is disclosed in U.S. Pat. No. 5,150,230. Firstly, a flanged split sleeve 48 is formed with axially extending slits 52 and a flange 50 defined with a plurality of radially extending slits 53 arranged in circumferentially spaced relationship from one another. A rod lens 6 is press-fitted into the flanged split sleeve 48. Then, a sleeve portion of a lens assembly 46 is inserted into a stepped sleeve 12, and the flange 50 of the lens assembly 46 is laser-welded to one end surface of the stepped sleeve 12 at four points P in the slits 52 and in some of the slits 53 of the flange 50 on only one side of each slit. In this manner, each point P of the laser welding is set on the only one side of each slit of the flange 50. Therefore, stresses due to shrinkage of the welded portions upon annealing can be made almost zero. This method is tried to eliminate tensile forces produced during the process of annealing the lens-type collimating assembly, but it surely causes more difficulties in the performance of welding and needs more personal skill and extra-care.

Another conventional method of manufacturing such a core collimating assembly is discussed here. Firstly, one or more fiber is inserted into a capillary and fixed with glue or epoxy. Secondly, the end face of the subassembly of the capillary and the fibers is polished to form an angle, preferably 6–8 degrees, which ensures the subassembly has the best light incident angle. Thirdly, the capillary is attached with a GRIN lens by applying epoxy onto the end face of the capillary. Finally, the collimating assembly of the capillary and the GRIN lens is baked for curing the epoxy, in which the temperature should be carefully controlled since a too high temperature will cause the capillary or GRIN lens broken.

Nevertheless, to apply the epoxy around the capillary uniformly and not to stain the fiber is one strict requirement, which demands good personal skills and extra-care on applying the epoxy, to the third process. If the epoxy is not uniformly attached to the capillary, then the GRIN lens may not be attached properly.

BRIEF SUMMARY OF THE INVENTION

A main object of the present invention is to solve the problems as discussed above, that is, to provide a method of manufacturing a collimating assembly which has the advantage of simple performance without the need of special personal skill and extra-care, and which provides a good yields and good thermal stability of the product.

In accordance with one aspect of the present invention, a method of manufacturing a collimating assembly includes the following steps: preparing a GRIN lens subassembly; preparing a dual-fiber (DF) pigtail subassembly; fitting the GRIN lens subassembly and the DF pigtail subassembly together; applying epoxy onto a junction zone between the GRIN lens subassembly and the DF pigtail subassembly; and baking the junction zone for curing the epoxy thereof until the epoxy spreading uniformly over the junction zone due to the so-called capillarity phenomenon.

The GRIN lens subassembly includes a GRIN lens, a filter adhered to an end of the GRIN lens, and a sleeve adhesively fixed around the opposite end of the GRIN lens. The DF pigtail subassembly has a pair of fibers each with one end fixed within a ferrule and a bushing secured around the ferrule. The sleeve and the bushing each have a corresponding mating end thereby forming a junction zone therebetween for facilitating uniformly flowing epoxy thereon in the step of baking the collimating assembly.

The first step of preparing the GRIN lens subassembly also comprises conglutinating a GRIN lens and a filter together, fixing a sleeve around the GRIN lens by applying epoxy therebetween, and properly heating for curing the epoxy.

Other objects, advantages and novel features of the invention will become more apparent from the following detailed description when taken in conjunction with the accompanying drawings.

DETAILED DESCRIPTION OF THE INVENTION

Figure 1:
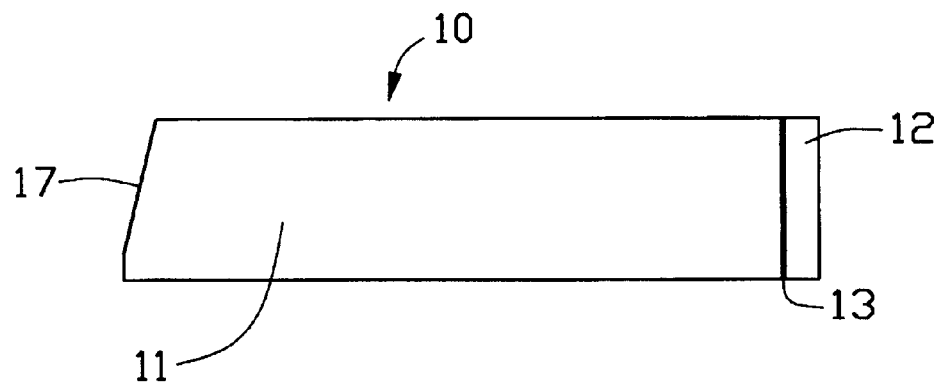
FIG. 1 is a side plan view of a GRIN lens attached with a filter in accordance with the present invention.

A method of manufacturing a collimating assembly 3 in accordance with the present invention, referring to FIGS. 1 to 7, includes the following steps: preparing a GRIN lens subassembly 1; preparing a dual-fiber (DF) pigtail subassembly 2; fitting the GRIN lens subassembly 1 and the DF pigtail subassembly 2 together to form the collimating assembly 3; applying epoxy 31 in a junction zone 34 between the GRIN lens subassembly 1 and the DF pigtail subassembly 2; and baking the junction zone 34 to cure the epoxy 31 until the epoxy 31 spreads uniformly over the junction zone 34 due to the so-called capillarity phenomenon.

Figure 2:
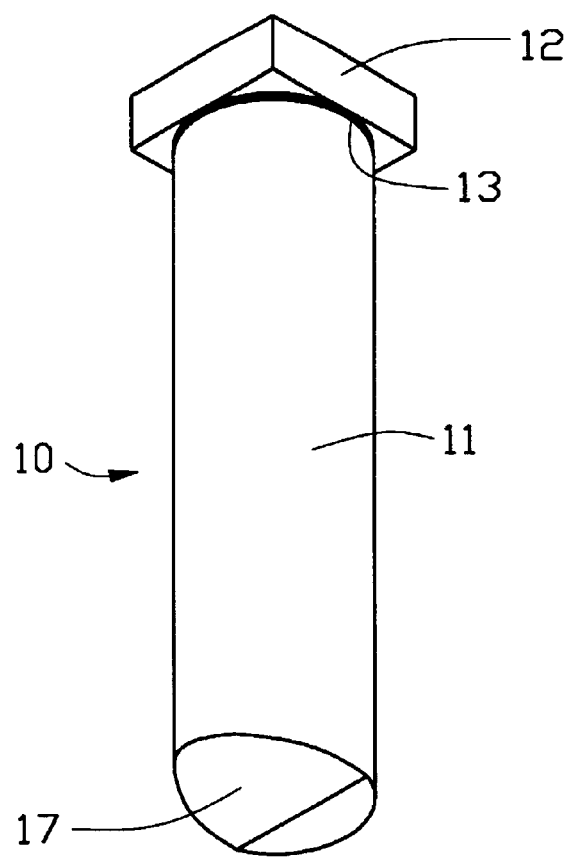
FIG. 2 is a perspective view of FIG. 1.
Figure 3:
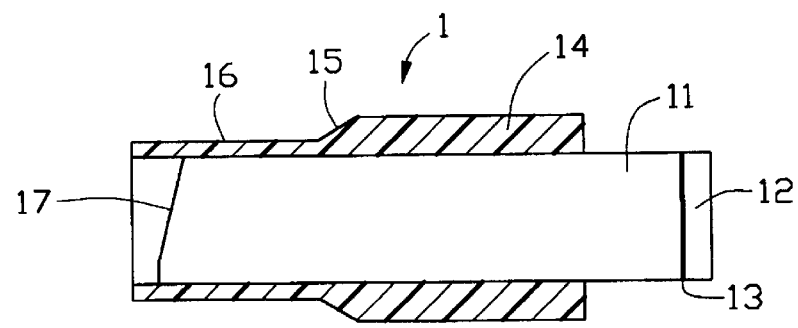
FIG. 3 is a cross sectional view of a GRIN lens subassembly in accordance with the present invention.

The GRIN lens subassembly 1, as shown in FIGS. 1–3, includes a GRIN lens 11, a filter 12 adhered to an end of the GRIN lens 11 by a kind of adhesive 13, and a sleeve 14 adhesively fixed around the opposite end of the GRIN lens 11. The GRIN lens 11 defines a slant surface 17 on an end thereof opposite to the filter 12 which is commonly angled at about 6–8 degrees relative to a vertical axis (not shown) perpendicular to a horizontal center axis of the GRIN lens 11. The filter 12 is selected to be big enough to cover the end surface of the GRIN lens 11. The filter 12 is a narrow band filter and can selectively reflect the light of some predetermined wavelengths.

Figure 4:
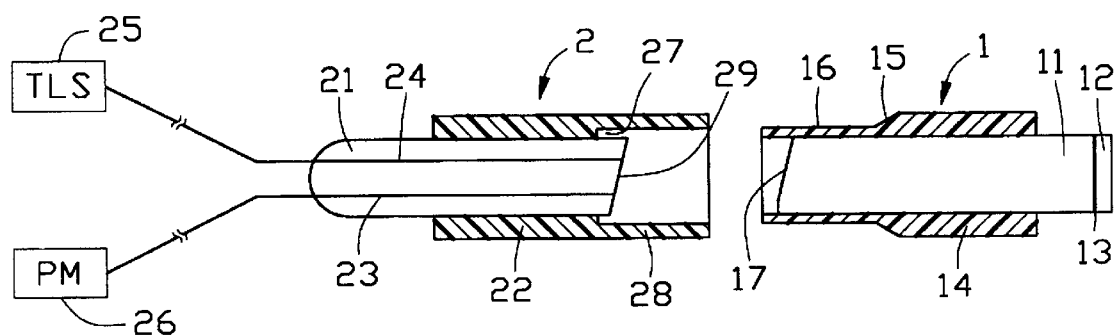
FIG. 4 is a cross sectional view of a collimating assembly before assembly thereof in accordance with the present invention.
Figure 5:
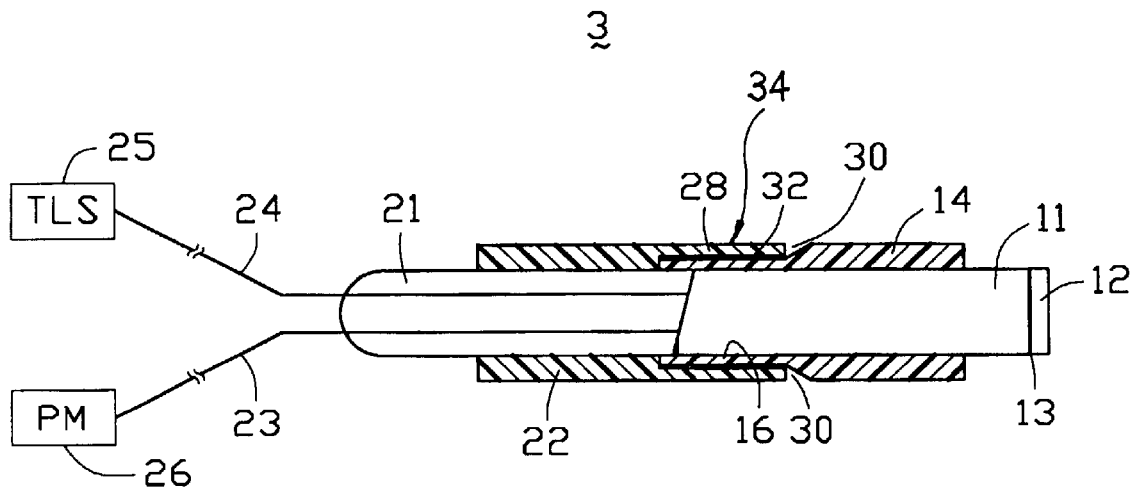
FIG. 5 is an assembled view of FIG. 4.
Figure 6:
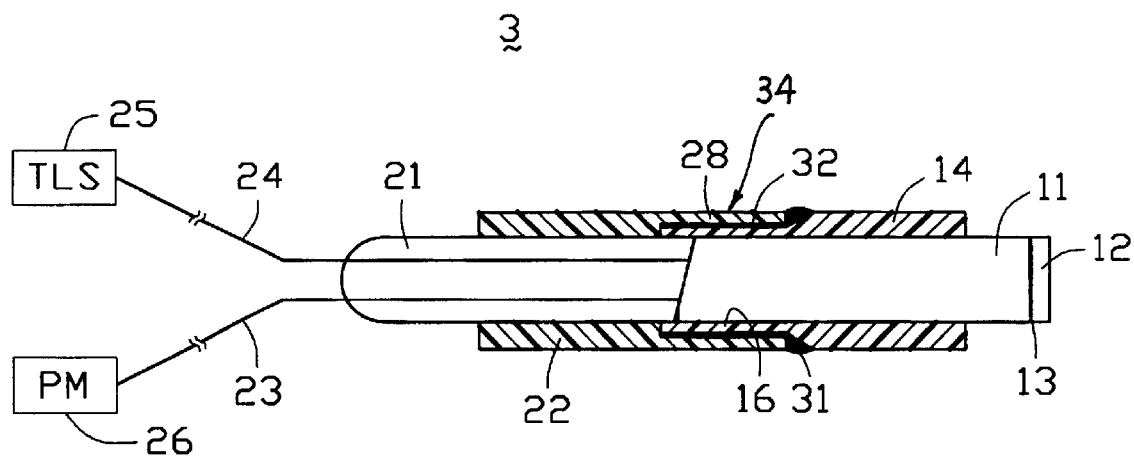
FIG. 6 is an assembled view of FIG. 4 with epoxy applied to the collimating assembly.
Figure 7:
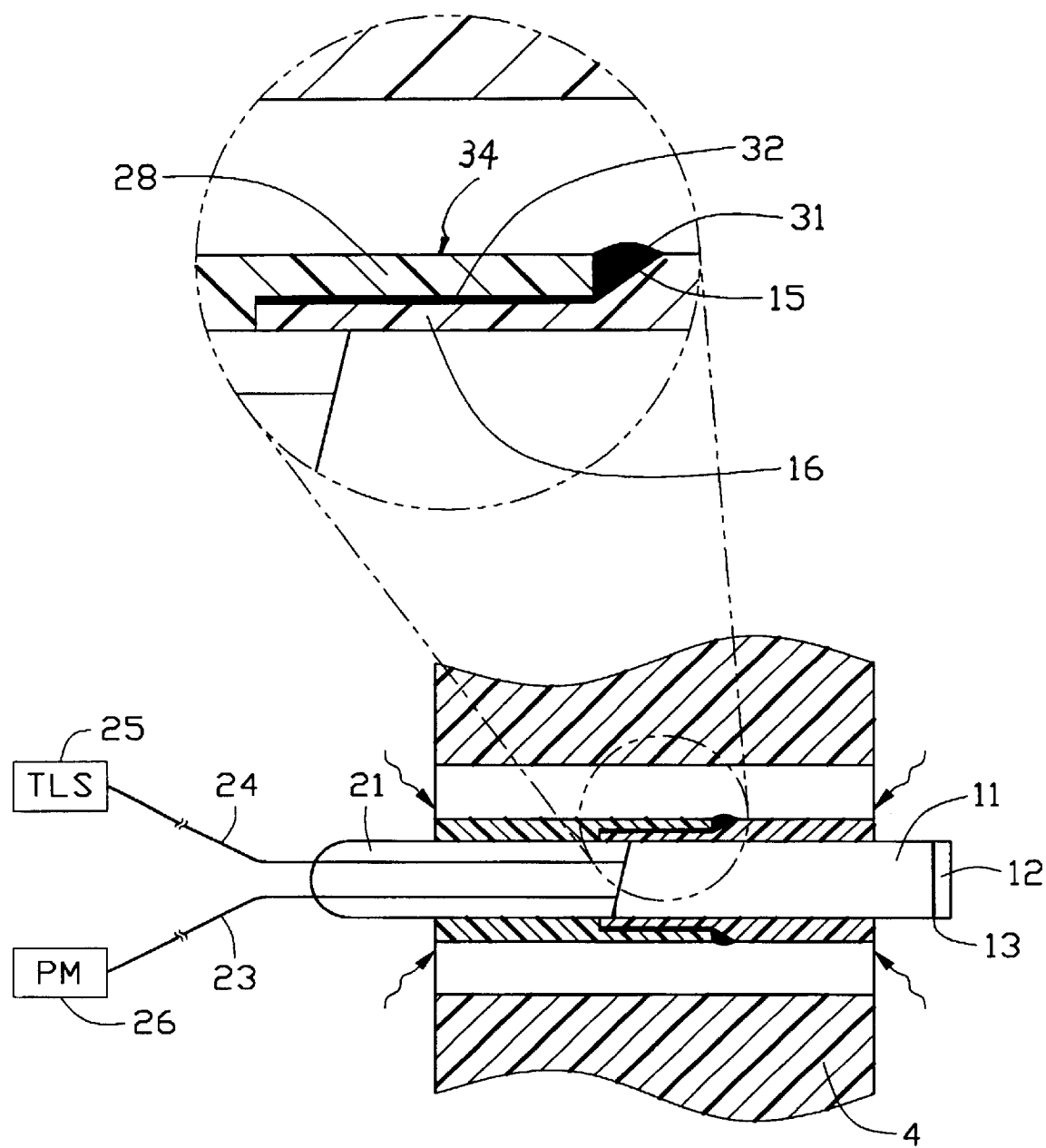
FIG. 7 is a cross sectional view of the collimating assembly and a heater within which the collimating assembly is positioned in accordance with the present invention.
Figure 8:
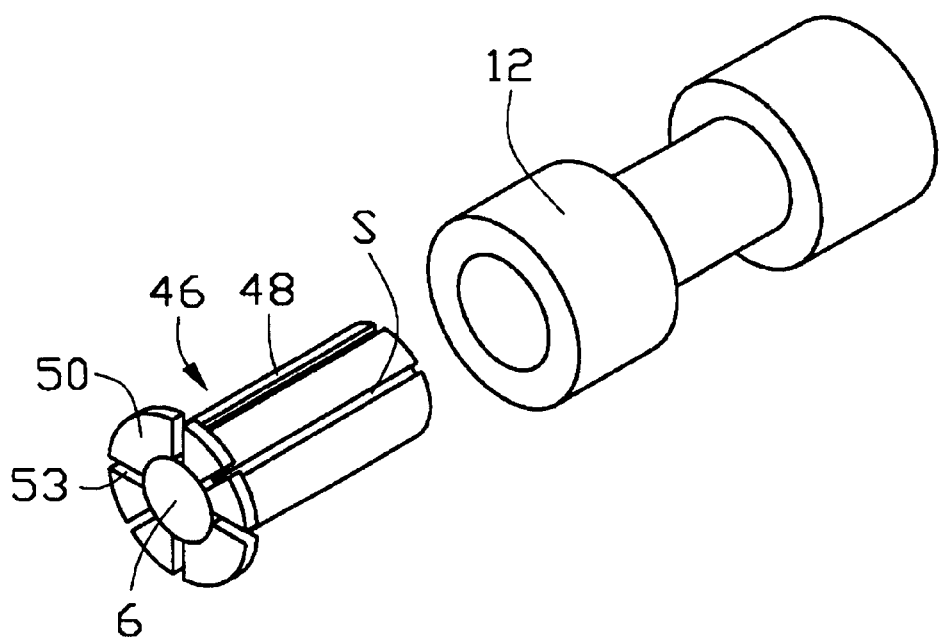
FIG. 8 is an exploded view of a conventional lens-type collimating assembly.
Figure 9:
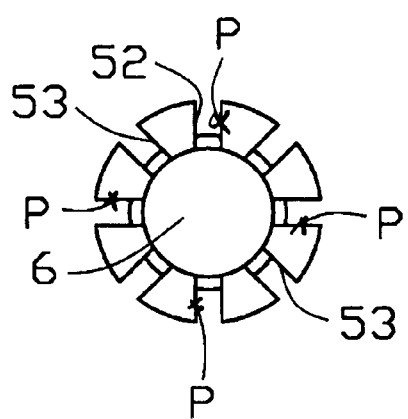
FIG. 9 is an end plan view of the conventional lens-type collimating assembly.

As shown in FIG. 4, the DF pigtail subassembly 2 has a pair of fibers 23, 24 each with one end fixed within a ferrule 21 and a bushing 22 secured around the ferrule 21, mostly by adhesive. The other ends of the fibers 23, 24 may be respectively connected to a tunable laser source (TLS) 25 and a power meter (PM) 26. The ferrule 21 also forms a declined surface 29 on an end thereof corresponding to the slant surface 17 of the GRIN lens 11 and commonly a convex end (not labeled) opposite to the declined surface 29.

The TLS 25 is used to produce required light beams which may transmit through the fiber 24 to enter into the GRIN lens 11 and the filter 12, then the selected light with the predetermined wavelength by the filter 12 will be reflected and exit via the fiber 23 to the PM 26. The PM 26 will show the exiting power of the wavelength-selected light and thus indicate the corresponding magnitude of insertion loss (IL) of the collimating assembly 3.

The sleeve 14 of the GRIN lens subassembly 1 and the bushing 22 of the DF pigtail subassembly 2 each have corresponding mating ends 16, 28 for mating with each other, thereby forming the junction zone 34 therebetween. The junction zone 34 has an important role in the present invention, as will be discussed in the following content, and can promote a uniform flow of the epoxy 31 therein during the step of baking the collimating assembly 3. The sleeve 14 and the bushing 22 may be made of metal, ceramic or other suitable materials.

The bushing 22 defines an inner through bore (not labeled) for accommodating the ferrule 21 therein. The mating end 28 extends integratively from the bushing 22 and is internally stepped thereby defining a cavity 27 in communication with the inner through bore. The sleeve 14 defines an inner through aperture (not labeled) as well for receiving the GRIN lens 11. The mating end 16 of the sleeve 14 is stepped on the outside surface of the remaining part of the sleeve 14 thereby forming an oblique surface 15 therebetween.

The first step of preparing the GRIN lens subassembly 1 also comprises steps of conglutinating the GRIN lens 11 and the filter 12, fixing the sleeve 14 around the GRIN lens 11 by applying some glue (not shown) therebetween, and properly heating the GRIN lens subassembly 1 for curing the glue. The GRIN lens subassembly 1 is preferably cured at a temperature of about 85 degrees centigrade for about 45 minutes.

The second step of preparing the DF pigtail subassembly 2 also includes a few subsequent sub-steps. The sub-steps are: preparing the ferrule 21 having the declined surface 29 at one end, the opposite convex end and 15 two passageways (not labeled) symmetrical about and parallel to a center axis (not shown) of the ferrule 21, fixing the ends of the pair of fibers 23, 24 into the corresponding passageways of the ferrule 21, and positioning and gluing the ferrule 21 within the bushing 22 with the convex end extending outside the bushing 22.

The third step is to fit the GRIN lens subassembly 1 and the DF pigtail subassembly 2 together thereby forming the collimating assembly 3. In this step, the externally stepped mating end 16 of the sleeve 14 enters into the cavity 27 of the mating end 28 of the bushing 22 thereby forming the junction zone 34 therebetween. The overlapping relationship between the mating end 16 of the sleeve 14 and the mating end 28 of the bushing 22 allows the formed collimating assembly 3 to be uneasy to fall apart during the following handling procedures. Nevertheless, although the mating end 16 of the sleeve 14 abuts against the inner surface of the mating end 28 of the bushing 22, there is inevitably a clearance 32 existed therebetween, as understood. Hence, the junction zone 34 is consisted of the mating end 28 of the bushing 22, the mating end 16 of the sleeve 14, the clearance 32 and an interspace 30 (FIG. 5) defined by the oblique surface 15 of the sleeve 14 and the end face of the mating end 28 of the bushing 22.

The third step also contains a step of applying some epoxy 31 into the interspace 30 of the junction zone 34. The amount of the epoxy 31 should be enough for filling in the interspace 30 and the clearance 32.

The slant surface 17 of the GRIN lens 11 and the declined surface 29 of the ferrule 21 thus confront each other. Hence, the dispersive light beam transmitted through the fiber 24 connecting to the TLS 25 may firstly be collimated into parallel light rays and then undergo wavelength-dependent reflection by the filter 12. Afterwards, the reflected light rays are transmitted backwards and are transmitted through the fiber 23 to the PM 26. The PM 26 may thus show the numerical value of the selectively reflected light rays' power, which also indicates the insertion loss (IL) of the collimating assembly 3.

The assembled collimating assembly 3 is then properly positioned relative to a heater 4, so that the junction zone 34 is located at a center position of the heater 4, where the heater 4 may cure the epoxy 31 best and most efficiently. The heater 4 may be any kind of suitable heating mechanism or instrument as commonly adopted in the industry. When the epoxy 31 is melted, it will flow into the clearance 32 of the junction zone 34 due to the so-called capillarity phenomenon. Hence, the epoxy 31 can spread evenly to fill in the clearance 32 around the junction zone 34, thereby ensuring good adhesive quality thereof. Some epoxy 31 may further invade the interior of the bushing 22 of the subassembly 2 for securing the inner ferrule 21 thereto.

At the same time the collimating assembly 3 is heated in the heater 4, the DF pigtail subassembly 2 is properly adjusted relative to the GRIN lens subassembly 1 until the numerical value shown by the PM 26 reaches its maximum, that is, the IL is at its minimum. Then, the position gaining minimum IL will be kept until the fourth step is completed to form the finished collimating assembly. As a result, the so-formed collimating assembly has the minimum IL value.

Since the present invention method apply the epoxy 31 to the interspace 30 of the junction zone 34 after the GRIN lens subassembly 1 and the FD pigtail subassembly 2 are mated together, but does not directly apply the epoxy 31 to the corresponding end faces of the mating ends 16 and 28 of the sleeve 14 and the bushing 22, the possibility of staining the epoxy 31 onto the corresponding end faces of the GRIN lens 11 and the ferrule 21 is eliminated accordingly.

In addition, when the sleeve 14 and the bushing 22 are made of glass, their outer diameters are commonly about 2.8 mm, when applying epoxy. Extra metal tubes are required, which will result in a larger outer diameter reaching 3.2 mm, for obtaining proper mechanical strength thereof. Instead, if metal is used to make the sleeve 14 and the bushing 22 when epoxy is chosen to apply, no extra tube is required to obtain enough mechanical strength, and the outer diameters of the metal sleeve 14 and the metal bushing 22 are only about 2.2 mm.

Another embodiment of the instant invention involves using UV glue to replace the adhesive, the glue, and the epoxy 31, which are respectively applied between the GRIN lens 11 and the filter 12, the sleeve 14 and the GRIN lens 11, the bushing 22 and the ferrule 21, and in the junction zone 34 of the collimating assembly 3. UV gun may be adopted to cure the UV glue very conveniently as well known in the industry.

At the same time, the sleeve 14 and the bushing 22 choose glass as their constructing material. In the case of using the glass sleeve 14 and the glass bushing 22, applying UV glue may render the outer diameter of the sleeve 14 and the bushing 22 smaller than that of applying epoxy. That is because no extra tube is required for strengthening purpose as the UV glue can satisfy the purpose by itself, so that the outer diameters of the sleeve 14 and the bushing 22 may be only about 2.2 mm.

Therefore, as discussed above, while gaining exactly the same results as using the epoxy 31, adhesive and glue as discussed above, applying UV glue also gives the advantages such as time-saving, yield increases, better performance, small size and no requirements of special personal kills or extra cares.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of manufacturing a collimating assembly comprises steps of:

preparing a GRIN lens subassembly employing a sleeve forming a first stepped mating end;

preparing a collimator pigtail subassembly employing a bushing forming a second stepped mating end;

fitting the GRIN lens subassembly and the collimator pigtail subassembly together, forming a junction zone therebetween, wherein the junction zone is defined as that area where the first and second stepped mating ends of the sleeve and the bushing overlap each other, and the junction zone includes an interspace defined between the sleeve and the bushing;

applying adhesive into the interspace of the junction zone between the GRIN lens subassembly and the collimator pigtail subassembly;

and baking the junction zone to cure the epoxy therein until the epoxy spreads uniformly over the junction zone due to the so-called capillarity phenomenon.

2. The method of manufacturing a collimating assembly as claimed in claim 1, wherein the step of preparing a GRIN lens subassembly includes forming an oblique surface between the mating end of the sleeve and the outside surface of the remaining part of the sleeve.

3. The method of manufacturing a collimating assembly as claimed in claim 2, wherein the step of fitting the GRIN lens subassembly and the collimator pigtail subassembly together includes defining the interspace between a free end face of the mating end of the bushing and the oblique surface of the sleeve.

4. The method of manufacturing a collimating assembly as claimed in claim 1, wherein the step of preparing the GRIN lens subassembly includes a sub-step of conglutinating a GRIN lens and a filter.

5. The method of manufacturing a collimating assembly as claimed in claim 4, wherein the step of preparing the GRIN lens subassembly includes a sub-step of fixing the sleeve around the GRIN lens by applying epoxy therebetween.

6. The method of manufacturing a collimating assembly as claimed in claim 5, wherein the step of preparing the GRIN lens subassembly includes a sub-step of properly heating the GRIN lens subassembly for curing the epoxy.

7. The method of manufacturing a collimating assembly as claimed in claim 1, wherein the step of preparing the collimator pigtail subassembly includes defining an inner through bore in the bushing and a cavity in an internal surface of the mating end of the bushing and in communication with the inner through bore.

8. The method of manufacturing a collimating assembly as claimed in claim 7, wherein the step of preparing the collimator pigtail subassembly includes positioning a ferrule in the through bore of the bushing, and fixing corresponding ends of a pair of dual fibers within the ferrule by adhesive with opposite ends of the pair of dual fibers extending outside the collimator subassembly.

9. The method of manufacturing a collimating assembly as claimed in claim 8, wherein the step of preparing the collimator pigtail subassembly includes connecting the corresponding outwardly-extending ends of the dual fibers with a tunable laser source and a power meter respectively.

10. The method of manufacturing a collimating assembly as claimed in claim 1, wherein the step of preparing the GRIN lens subassembly and the collimator pigtail subassembly include preparing the sleeve and the bushing both made of glass and applying UV glue to fix the sleeve and the bushing together.

11. An optical assembly comprising:

first and second subassemblies;

said first subassembly including a GRIN lens securely surrounded by a sleeve;

said second subassembly including a ferrule securely surrounded by a bushing;

a pair of fibers retained within the ferrule with corresponding pigtails extending therefrom; wherein said sleeve defines a first end, said bushing defines a second end, said first and second ends complementarily comply with and overlap each other with a proper axial relationship therebetween to form a junction zone, and epoxy is applied to the junction zone for securement between the sleeve and the bushing; wherein a cavity is defined between the ferrule and the bushing of the second subassembly to receive an end portion of the first end of the sleeve of the first subassembly.

12. The optical assembly of claim 11, wherein an interspace is defined between the sleeve and the bushing and the interspace communicates with the junction zone for conveniently guiding the epoxy into the junction zone.

* * * * *